United States Patent
Arroyo et al.

(10) Patent No.: US 10,042,723 B2
(45) Date of Patent: Aug. 7, 2018

(54) FAILOVER OF A VIRTUAL FUNCTION EXPOSED BY AN SR-IOV ADAPTER

(71) Applicant: International Business Machines Corporation, Armonk, NY (US)

(72) Inventors: Jesse P. Arroyo, Rochester, MN (US); Charles S. Graham, Rochester, MN (US); Prathima Kommineni, Hyderabad (IN); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 15/050,904

(22) Filed: Feb. 23, 2016

(65) Prior Publication Data

US 2017/0242763 A1  Aug. 24, 2017

(51) Int. Cl.
  *G06F 11/20* (2006.01)
  *G06F 9/455* (2018.01)
  *G06F 11/14* (2006.01)

(52) U.S. Cl.
  CPC ...... *G06F 11/2007* (2013.01); *G06F 9/45558* (2013.01); *G06F 11/1484* (2013.01); *G06F 2009/4557* (2013.01); *G06F 2009/45575* (2013.01); *G06F 2201/805* (2013.01); *G06F 2201/815* (2013.01)

(58) Field of Classification Search
  CPC ......... G06F 9/4558; G06F 2009/45575; G06F 2009/4557
  See application file for complete search history.

(56) References Cited

U.S. PATENT DOCUMENTS

| 7,209,994 B1 | 4/2007 | Klaiber et al. |
| 7,240,364 B1 | 7/2007 | Branscomb et al. |
| 7,574,537 B2 | 8/2009 | Arndt et al. |
| 7,613,898 B2 | 11/2009 | Haertel et al. |

(Continued)

FOREIGN PATENT DOCUMENTS

| CN | 101488092 A | 7/2009 |
| CN | 104737138 A | 6/2015 |

(Continued)

OTHER PUBLICATIONS

Ajila et al., "Efficient Live Wide Area VM Migration With IP Address Change Using Type II Hypervisor", 2013 IEEE 14th International Conference on Information Reuse and Integration (IRI2013), Aug. 2013, pp. 372-379, IEEE Xplore Digital Library (online), DOI: 10.1109/IRI.2013.6642495.

(Continued)

*Primary Examiner* — Joseph O Schell
(74) *Attorney, Agent, or Firm* — Joseph D. Downing; Robert R. Williams; Kennedy Lenart Spraggins LLP (57) ABSTRACT

Failover of a virtual function exposed by an SR-IOV adapter of a computing system, including: instantiating, by a hypervisor, a standby virtual function in the computing system; detecting a loss of communication between a logical partition and an active virtual function mapped to the logical partition; placing the active virtual function and the standby virtual function in an error state; remapping the logical partition to the standby virtual function; and placing the standby virtual function in an error recovery state.

20 Claims, 4 Drawing Sheets

(56) References Cited

U.S. PATENT DOCUMENTS

| | | | |
|---|---|---|---|
| 7,734,843 B2 | 6/2010 | Bender et al. | |
| 7,813,366 B2 | 10/2010 | Freimuth et al. | |
| 7,882,326 B2 | 2/2011 | Armstrong et al. | |
| 7,937,518 B2 | 5/2011 | Boyd et al. | |
| 7,984,262 B2 | 7/2011 | Battista et al. | |
| 8,219,988 B2 | 7/2012 | Armstrong et al. | |
| 8,321,722 B2 | 11/2012 | Tanaka et al. | |
| 8,327,086 B2 | 12/2012 | Jacobs et al. | |
| 8,429,446 B2 | 4/2013 | Hara et al. | |
| 8,533,713 B2 | 9/2013 | Dong | |
| 8,561,065 B2 | 10/2013 | Cunningham et al. | |
| 8,561,066 B2 | 10/2013 | Koch et al. | |
| 8,607,230 B2 | 12/2013 | Hatta et al. | |
| 8,621,120 B2 | 12/2013 | Bender et al. | |
| 8,645,755 B2 | 2/2014 | Brownlow et al. | |
| 8,677,356 B2 | 3/2014 | Jacobs et al. | |
| 8,683,109 B2 | 3/2014 | Nakayama et al. | |
| 8,875,124 B2 | 10/2014 | Kuzmack et al. | |
| 8,984,240 B2 | 3/2015 | Aslot et al. | |
| 9,032,122 B2 | 5/2015 | Hart et al. | |
| 9,047,113 B2 | 6/2015 | Iwamatsu et al. | |
| 9,304,849 B2 | 4/2016 | Arroyo et al. | |
| 9,317,317 B2* | 4/2016 | Graham | G06F 9/45558 |
| 9,473,400 B1* | 10/2016 | DeVilbiss | H04L 45/70 |
| 9,501,308 B2 | 11/2016 | Arroyo et al. | |
| 9,552,233 B1 | 1/2017 | Tsirkin et al. | |
| 9,715,469 B1 | 7/2017 | Arroyo et al. | |
| 9,720,862 B1 | 8/2017 | Arroyo et al. | |
| 9,720,863 B1 | 8/2017 | Arroyo et al. | |
| 9,740,647 B1 | 8/2017 | Arroyo et al. | |
| 9,760,512 B1 | 9/2017 | Arroyo et al. | |
| 2002/0083258 A1 | 6/2002 | Bauman et al. | |
| 2003/0050990 A1 | 3/2003 | Craddock et al. | |
| 2003/0204648 A1 | 10/2003 | Arndt | |
| 2004/0064601 A1 | 4/2004 | Swanberg | |
| 2004/0205272 A1 | 10/2004 | Armstrong et al. | |
| 2004/0243994 A1 | 12/2004 | Nasu | |
| 2006/0179177 A1 | 8/2006 | Arndt et al. | |
| 2006/0195618 A1 | 8/2006 | Arndt et al. | |
| 2006/0195620 A1 | 8/2006 | Arndt et al. | |
| 2006/0281630 A1 | 12/2006 | Bailey et al. | |
| 2007/0157197 A1 | 7/2007 | Neiger et al. | |
| 2007/0260768 A1 | 11/2007 | Bender et al. | |
| 2008/0005383 A1 | 1/2008 | Bender et al. | |
| 2008/0114916 A1 | 5/2008 | Hummel et al. | |
| 2008/0147887 A1 | 6/2008 | Freimuth et al. | |
| 2009/0133016 A1 | 5/2009 | Brown et al. | |
| 2009/0133028 A1 | 5/2009 | Brown et al. | |
| 2009/0249366 A1 | 10/2009 | Sen et al. | |
| 2009/0276773 A1 | 11/2009 | Brown et al. | |
| 2010/0036995 A1 | 2/2010 | Nakayama et al. | |
| 2010/0250824 A1 | 9/2010 | Belay | |
| 2010/0262727 A1 | 10/2010 | Arndt | |
| 2011/0197003 A1 | 8/2011 | Serebrin et al. | |
| 2011/0320860 A1 | 12/2011 | Coneski et al. | |
| 2012/0042034 A1 | 2/2012 | Goggin et al. | |
| 2012/0131232 A1* | 5/2012 | Brownlow | G06F 13/4221 710/10 |
| 2012/0131576 A1 | 5/2012 | Hatta et al. | |
| 2012/0137288 A1 | 5/2012 | Barrett et al. | |
| 2012/0137292 A1 | 5/2012 | Iwamatsu et al. | |
| 2012/0151473 A1 | 6/2012 | Koch et al. | |
| 2012/0167082 A1 | 6/2012 | Kumar et al. | |
| 2012/0179932 A1 | 7/2012 | Armstrong et al. | |
| 2012/0191935 A1* | 7/2012 | Oberly, III | G06F 9/465 711/166 |
| 2012/0246644 A1* | 9/2012 | Hattori | G06F 9/4411 718/1 |
| 2012/0265910 A1* | 10/2012 | Galles | G06F 13/4022 710/300 |
| 2013/0086298 A1 | 4/2013 | Alanis et al. | |
| 2013/0159572 A1 | 6/2013 | Graham et al. | |
| 2013/0191821 A1 | 7/2013 | Armstrong et al. | |
| 2014/0149985 A1 | 5/2014 | Takeuchi | |
| 2014/0181801 A1 | 6/2014 | Voronkov et al. | |
| 2014/0245296 A1 | 8/2014 | Sethuramalingam et al. | |
| 2014/0281263 A1 | 9/2014 | Deming et al. | |
| 2014/0351471 A1 | 11/2014 | Jebson et al. | |
| 2014/0372739 A1 | 12/2014 | Arroyo et al. | |
| 2014/0372789 A1* | 12/2014 | Arroyo | G06F 11/0712 714/4.5 |
| 2014/0372795 A1* | 12/2014 | Graham | G06F 11/0712 714/15 |
| 2015/0006846 A1 | 1/2015 | Youngworth | |
| 2015/0052282 A1 | 2/2015 | Dong | |
| 2015/0120969 A1 | 4/2015 | He et al. | |
| 2015/0193248 A1 | 7/2015 | Noel et al. | |
| 2015/0193250 A1 | 7/2015 | Ito et al. | |
| 2015/0229524 A1 | 8/2015 | Engebretsen et al. | |
| 2015/0301844 A1* | 10/2015 | Droux | G06F 9/45558 718/1 |
| 2015/0317274 A1 | 11/2015 | Arroyo et al. | |
| 2015/0317275 A1 | 11/2015 | Arroyo et al. | |
| 2016/0019078 A1* | 1/2016 | Challa | G06F 9/45558 718/1 |
| 2016/0246540 A1 | 8/2016 | Blagodurov et al. | |
| 2016/0350097 A1 | 12/2016 | Mahapatra et al. | |
| 2017/0046184 A1 | 2/2017 | Tsirkin et al. | |
| 2017/0199768 A1 | 7/2017 | Arroyo et al. | |
| 2017/0242720 A1 | 8/2017 | Anand et al. | |
| 2017/0242756 A1 | 8/2017 | Arroyo et al. | |
| 2017/0249136 A1 | 8/2017 | Anand et al. | |

FOREIGN PATENT DOCUMENTS

| | | |
|---|---|---|
| JP | 2012-113660 A | 6/2012 |
| JP | 5001818 B | 8/2012 |

OTHER PUBLICATIONS

PCI-SIG, "Single Root I/O Virtualization and Sharing Specification-Revision 1.0", Sep. 2007, PCI-SIG Specifications Library, pcisig.com (online), URL: pcisig.com/specifications/iov/single_root/.

Axnix et al. "IBM z13 firmware innovations for simultaneous multithreading and I/O virtualization", IBM Journal of Research and Development, Jul./Sep. 2015, vol. 59, No. 4/5, 11-1, International Business Machines Corporation (IBM), Armonk, NY.

Salapura et al., "Resilient cloud computing", IBM Journal of Research and Development, Sep./Oct. 2013, vol. 57, No. 5, 10-1, 12 pages, International Business Machines Corporation (IBM), Armonk, NY.

Challa, "Hardware Based I/O Virtualization Technologies for Hypervisors, Configurations and Advantages—A Study", 2012 IEEE International Conference on Cloud Computing in Emerging Markets (CCEM), Oct. 2012, pp. 99-103, IEEE Xplore Digital Library (online), DOI: 10.1109/CCEM.2012.6354610.

ROC920150333US1, Appendix P; List of IBM Patent or Applications Treated as Related, Jan. 4, 2017, 2 pages.

Xu et al., *SRVM: Hypervisor Support for Live Migration with Passthrough SR-IOV Network Devices*, Proceedings of the 12th ACM SIGPLAN/SIGOPS International Conference on Virtual Execution Environments (VEE'16), Apr. 2016, pp. 65-77, ACM New York, NY, USA.

Huang et al., *Nomad: Migrating OS-bypass Networks in Virtual Machines*, Proceedings of the 3rd International Conference on Virtual Execution Environments (VEE'07), Jun. 2007, pp. 158-168, ACM New York, NY, USA.

ROC920150333US1, Appendix P; List of IBM Patent or Applications Treated as Related, May 26, 2017, 2 pages.

ROC920150333US1, Appendix P; List of IBM Patent or Applications Treated as Related, Jul. 19, 2017, 2 pages.

Xu et al., "Multi-Root I/O Virtualization Based Redundant Systems", 2014 Joint 7th International Conference on Soft Computing and Intelligent Systems (SCIS) and 15th International Symposium on Advanced Intelligent Systems (ISIS), Dec. 2014, pp. 1302-1305, IEEE Xplore Digital Library (online), DOI: 10.1109/SCIS-ISIS.2014.7044652.

(56) References Cited

OTHER PUBLICATIONS

U.S. Appl. No. 15/299,512, to Jesse P. Arroyo et al., entitled, *Migrating MMIO From a Source I/O Adapter of a Computing System to a Destination I/O Adapter of the Computing System*, assigned to International Business Machines Corporation, 35 pages, filed Oct. 21, 2016.

U.S. Appl. No. 15/467,183, to Jesse P. Arroyo et al., entitled, *Migrating Interrupts From a Source I/O Adapter of a Computing System to a Destination I/O Adapter of The Computing System*, assigned to International Business Machines Corporation, 35 pages, filed Mar. 23, 2017.

U.S. Appl. No. 15/467,025, to Jesse P. Arroyo et al., entitled, *Migrating Interrupts From a Source I/O Adapter of a Source Computing System to a Destination I/O Adapter of a Destination Computing System* assigned to International Business Machines Corporation, 38 pages, filed Mar. 23, 2017.

U.S. Appl. No. 15/467,052, to Jesse P. Arroyo et al., entitled, *Migrating MMIO From a Source I/O Adapter of a Source Computing System to a Destination I/O Adapter of a Destination Computing System*, assigned to International Business Machines Corporation, 38 pages, filed Mar. 23, 2017.

U.S. Appl. No. 15/617,170, to Jesse P. Arroyo et al., entitled, *Migrating MMIO From a Source I/O Adapter of a Computing System to a Destination I/O Adapter of The Computing System*, assigned to International Business Machines Corporation, 36 pages, filed Jun. 8, 2017.

* cited by examiner

FAILOVER OF A VIRTUAL FUNCTION EXPOSED BY AN SR-IOV ADAPTER

BACKGROUND

Field of the Invention

The field of the invention is data processing, or, more specifically, methods, apparatus, and products for failover of a virtual function exposed by an SR-IOV adapter.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of advancement includes data centers providing cloud services with various types of virtualization services. Regardless of the particular type of virtualization service being offered, most virtualization services make use of massive amounts of data I/O traffic and network bandwidth. In such a computing environment, an industry standard specification, SR-IOV ('Single Root I/O Virtualization'), exists for creating virtual processes that allow for independent access to I/O hardware resources of a shared network device. However, problems still exist in reducing the impact from hardware failures or updates on the hardware being utilized by the virtualization services.

SUMMARY

Methods, apparatus, and products for failover of a virtual function exposed by an SR-IOV adapter of a computing system are disclosed in this specification. The virtual function is mapped to a logical partition of the computing system. Such failover includes: instantiating, by a hypervisor, a standby virtual function in the computing system; detecting a loss of communication between a logical partition and an active virtual function mapped to the logical partition; placing the active virtual function and the standby virtual function in an error state; remapping the logical partition to the standby virtual function; and placing the standby virtual function in an error recovery state.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
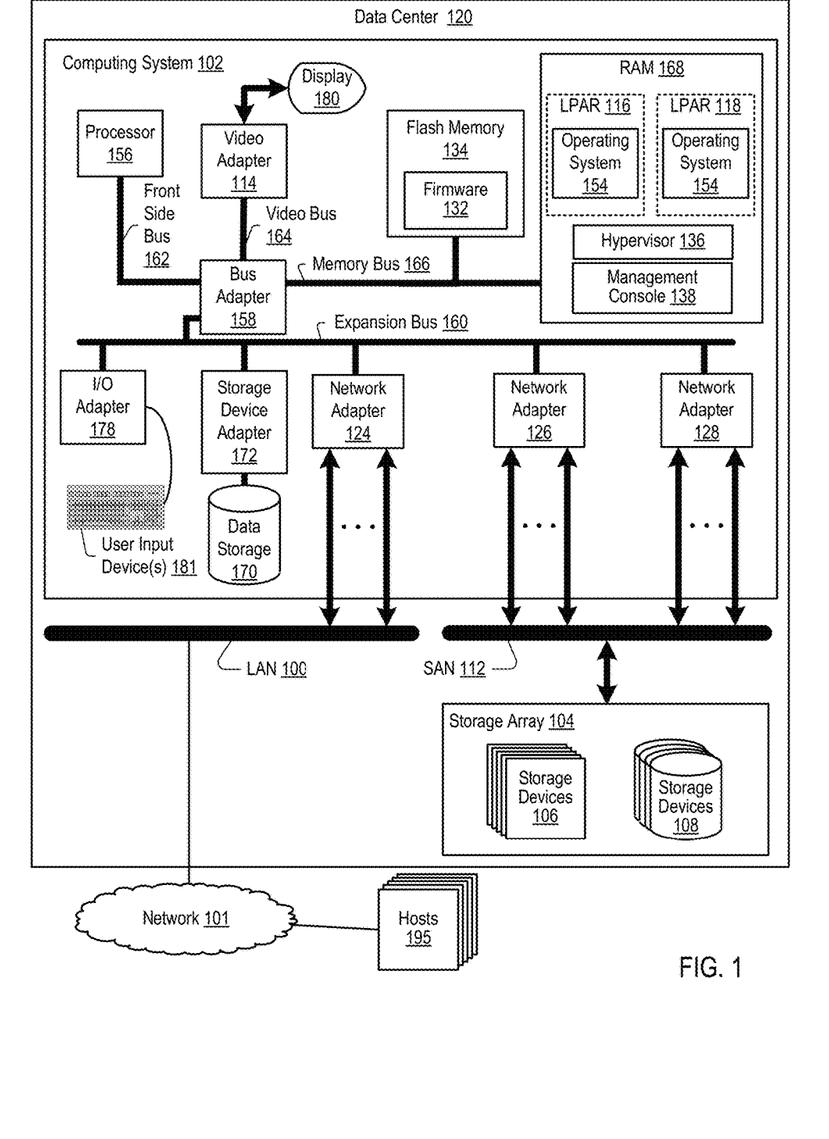
FIG. 1 sets forth an example system configured for failover of a virtual function exposed by an SR-IOV adapter of a computing system.

Embodiments of methods, apparatus, and computer program products for failover of a virtual function exposed by an SR-IOV adapter of a computing system are described with reference to the accompanying drawings, beginning with FIG. 1. FIG. 1 sets forth an example system configured for failover of a virtual function exposed by an SR-IOV adapter of a computing system. The example of FIG. 1 includes a data center (120). Such a data center may provide clients on host devices (195) with virtualization services for enabling various cloud related product offerings.

The example data center (120) of FIG. 1 includes automated computing machinery in the form of a computing system (102) configured for failover of a virtual function exposed by an SR-IOV adapter of a computing system. SR-IOV, Single-root I/O virtualization, is an extension to the PCI Express (PCIe) specification. SR-IOV allows a device, such as a network adapter, to separate access to its resources among various PCIe hardware functions. These functions consist of the following types: A PCIe Physical Function (PF) and a PCIe Virtual Function (VF). The PF advertises the device's SR-IOV capabilities. Each VF is associated with a device's PF. A VF shares one or more physical resources of the device, such as a memory and a network port, with the PF and other VFs on the device. From the perspective of a logical partition (116, 118) instantiated by a hypervisor (136), a VF appears as a fully functional physical PCIe adapter. In this way, a single physical adapter may be 'shared' amongst many logical partitions or multiple virtual functions may be instantiated for use by a single logical partition.

The computing system (102) includes at least one computer processor (156) or "CPU" as well as random access memory (168) or "RAM," which is connected through a high speed memory bus (166) and bus adapter (158) to processor (156) and to other components of the computing system (102).

Stored in RAM (168) is a hypervisor (136) and a management console (138). The management console (138) may provide a user interface through which a user may direct the hypervisor (136) on instantiating and maintaining multiple logical partitions (116, 118), where each logical partition may provide virtualization services to one or more clients. Although depicted in the example of FIG. 1 as being stored in RAM (168) of computer (102) for ease of explanation, readers will understand that such a management console may be implemented in a system entirely separate from the computer (102).

Also stored in RAM (168) are two instances of an operating system (154), one for each logical partition (116, 118). Operating systems useful in computers configured for failover of a virtual function exposed by an SR-IOV adapter of a computing system according to various embodiments include UNIX™, Linux™, Microsoft Windows™, AIX™, IBM's i™ operating system, and others as will occur to those of skill in the art. The operating systems (154), hypervisor (136), and management console (138) are shown in RAM (168), but many components of such software may typically be stored in non-volatile memory such as, for example, on a data storage (170) device or in firmware (132).

The computing system (102) may also include a storage device adapter (172) coupled through expansion bus (160) and bus adapter (158) to processor (156) and other components of the computing system (102). Storage device adapter (172) connects non-volatile data storage to the computing system (102) in the form of data storage (170). Storage device adapters useful in computers configured for failover of a virtual function exposed by an SR-IOV adapter of a computing system according to various embodiments include Integrated Drive Electronics ("IDE") adapters, Small Computing system Interface ("SCSI") adapters, and others as will occur to those of skill in the art. Non-volatile computer memory also may be implemented for as an optical disk drive, electrically erasable programmable read-only memory (so-called "EEPROM" or "Flash" memory (134)), RAM drives, and so on, as will occur to those of skill in the art.

The example computing system (102) may also include one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computing system (102) may also include a video adapter (114), which may be an example of an I/O adapter specially designed for graphic output to a display device (180) such as a display screen or computer monitor. Video adapter (114) may be connected to processor (156) through a high speed video bus (164), bus adapter (158), and the front side bus (162), which may also be a high speed bus.

The example computing system (102) of FIG. 1 also includes several I/O adapters which may be implemented as SR-IOV adapters in the form of network adapters (124, 126, and 128). Any of the example network adapters from among network adapters (124, 126, and 128) may be configured to support SR-IOV and provide multiple virtual functions, where each of the virtual functions may be mapped to a respective logical partition (116, 118). In this way, each of the logical partitions may independently use a physical network adapter that is being shared among different logical partitions. Such network adapters may also be configured for data communications with other computers or devices (not shown) and for data communications with a data communications network (100, 101). Such data communications may be carried out serially through RS-232 connections, through external buses such as a Universal Serial Bus ("USB"), through PCI and PCIe fabrics, through data communications networks such as IP data communications networks, and in other ways as will occur to those of skill in the art. Network adapters may implement the hardware level of data communications through which one computer sends data communications to another computer, directly or through a data communications network. Examples of communications adapters useful in computers configured for failover of a virtual function exposed by an SR-IOV adapter of a computing system according to various embodiments include modems for wired dial-up communications, Ethernet (IEEE 802.3) adapters for wired data communications, and 802.11 adapters for wireless data communications.

The network adapters (124, 126, and 128) may further be configured for data communications with hosts (195) over a network (101) reachable through local area networks (LANs), such as LAN (100). The network adapters (124, 126, and 128) may further be configured for data communications with storage area networks (SANs), such as SAN (112), and for data communications with various storage devices in a storage array (104), such as storage devices (106) and storage devices (108).

From time to time and for various reasons, a virtual function of an SR-IOV adapter may fail. In such an instance, the logical partition mapped to the virtual function may lose communication via the virtual function. To that end, the computing system (102) of FIG. 1 may be configured for failover of a virtual function exposed by an SR-IOV adapter. The hypervisor (136) in the example of FIG. 1 may carry out failover of a virtual function exposed by the network adapter (126, for example), by: instantiating a standby virtual function in the computing system; detecting a loss of communication between a logical partition (116, for example) and an active virtual function mapped to the logical partition; placing the active virtual function and the standby virtual function in an error state; remapping the logical partition to the standby virtual function; and placing the standby virtual function in an error recovery state. After recovering from the error state, the logical partition and the standby virtual function will reestablish a data communications connection and proceed with I/O data communications. In this way, a logical partition that loses communication via a virtual function may, transparently from the perspective of the logical partition, be failed over to another virtual function without modifying any I/O parameters in the logical partition itself.

While in this disclosure, various embodiments are described in the context of the SR-IOV standard and PCIe, such descriptions are intended to be illustrative, not limiting. Readers will recognize that failover of a virtual function exposed by an SR-IOV adapter of a computing system may be carried out utilizing other virtualization standards, or no standard at all.

The network adapters (124, 126, and 128) are for purposes of illustration, not for limitation. Other I/O adapters may be utilized in failover of a virtual function exposed by an SR-IOV adapter of a computing system. Similarly, data centers according to various embodiments may include additional servers, routers, other devices, and peer-to-peer architectures, not shown in the figures, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments may be implemented on a variety of hardware platforms in addition to those illustrated.

Figure 2:
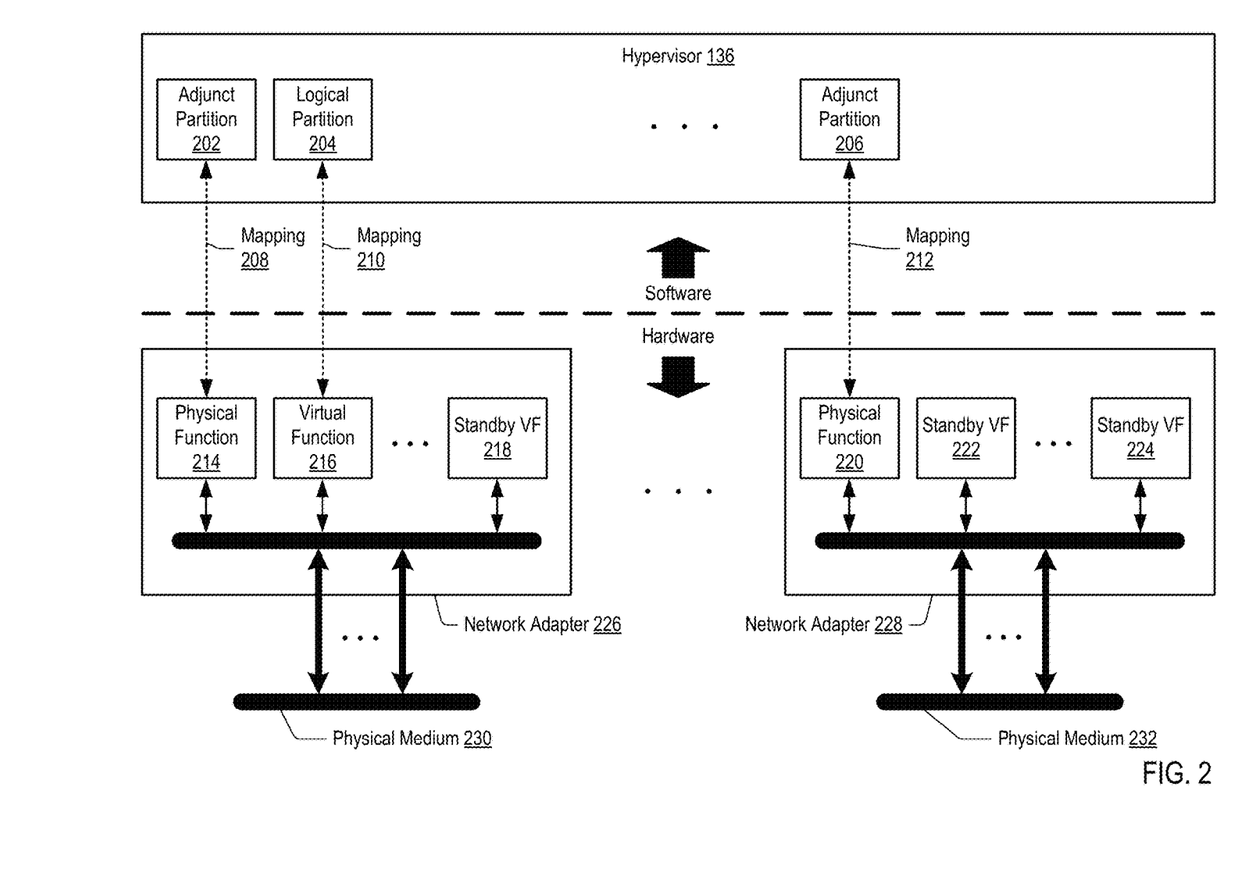
FIG. 2 sets forth an example computing system in which a logical partition is mapped to a virtual function exposed by an SR-IOV adapter and the system is configured for failover of a virtual function exposed by an SR-IOV adapter of a computing system.

For further explanation, the system of FIG. 2 sets forth an example computing system in which a logical partition is mapped to a virtual function exposed by an SR-IOV adapter and the system is configured for failover of a virtual function exposed by an SR-IOV adapter of a computing system. The system of FIG. 2 includes a hypervisor (136) is coupled for data communications over a physical medium (230, 232) through one or more network adapters (226, 228). The hypervisor (136) in the example of FIG. 2 supports execution of a logical partition (204) and a plurality of adjunct partitions (202, 206). The logical partition (204) is mapped (210) to a virtual function (216) exposed by the network adapter (226). The logical partition (204) in the example of FIG. 2 may be mapped (210) to the virtual function (216) exposed by network adapter (226) with: information for identifying a PCIe slot for the network adapter for a virtual function; specifications of direct memory access (DMA) memory space; mappings for memory mapped input output (MMIO); and other configurations or settings that enable a given logical partition to communicate and use physical resources by interfacing with a given virtual function on a network adapter. Such mappings are generally maintained by the hypervisor (136) and an adjunct partition.

An adjunct partition as the term is used in this specification refers to a partition instantiated by a hypervisor and configured for management of SR-IOV adapter resources, including various configuration parameters of virtual functions (216) exposed by the network adapter (226). In some embodiments, for example, each adjunct partition (202, 206) is associated and mapped (208, 212) with a physical function (214, 220) of a discrete network adapter (226, 228). The adjunct partition may include, in addition to a kernel, a driver for managing a network adapter through a management channel specified in the protocol for the network adapter.

The example system of FIG. 2 may be configured for failover of the virtual function (202) exposed by the SR-IOV network adapter (226). That is, in an instance in which the logical partition (204) loses communication through the virtual function (216), the system of FIG. 2 may recover such communication by failover to a different virtual function.

To that end, the hypervisor may instantiate a standby virtual function in the computing system. The system of FIG. 2 includes several example standby virtual functions including a standby virtual function (218) exposed on the same network adapter (226) as the virtual function (216) experiencing the loss of data communications and a pool of standby virtual functions (222, 224) instantiated on a different SR-IOV adapter (228).

In the system of FIG. 2, the hypervisor (136) may detect a loss of communication between a logical partition and an active virtual function (216) mapped (210) to the logical partition (204) and place the active virtual function and the standby virtual function in an error state. An error state may include the 'EEH' (enhanced error handling) error state which is an extension to the PCI standard specification and enabled in system that run on IBM's Power™ processor. The hypervisor may then remap the logical partition (204) to the standby virtual function (such as the standby virtual function (218)); and place the standby virtual function in an error recovery state. Once recovered, the logical partition may communicate with the standby virtual function without any knowledge that the standby virtual function (218) is not the virtual function that was previously used by the logical partition for communication.

Figure 3:
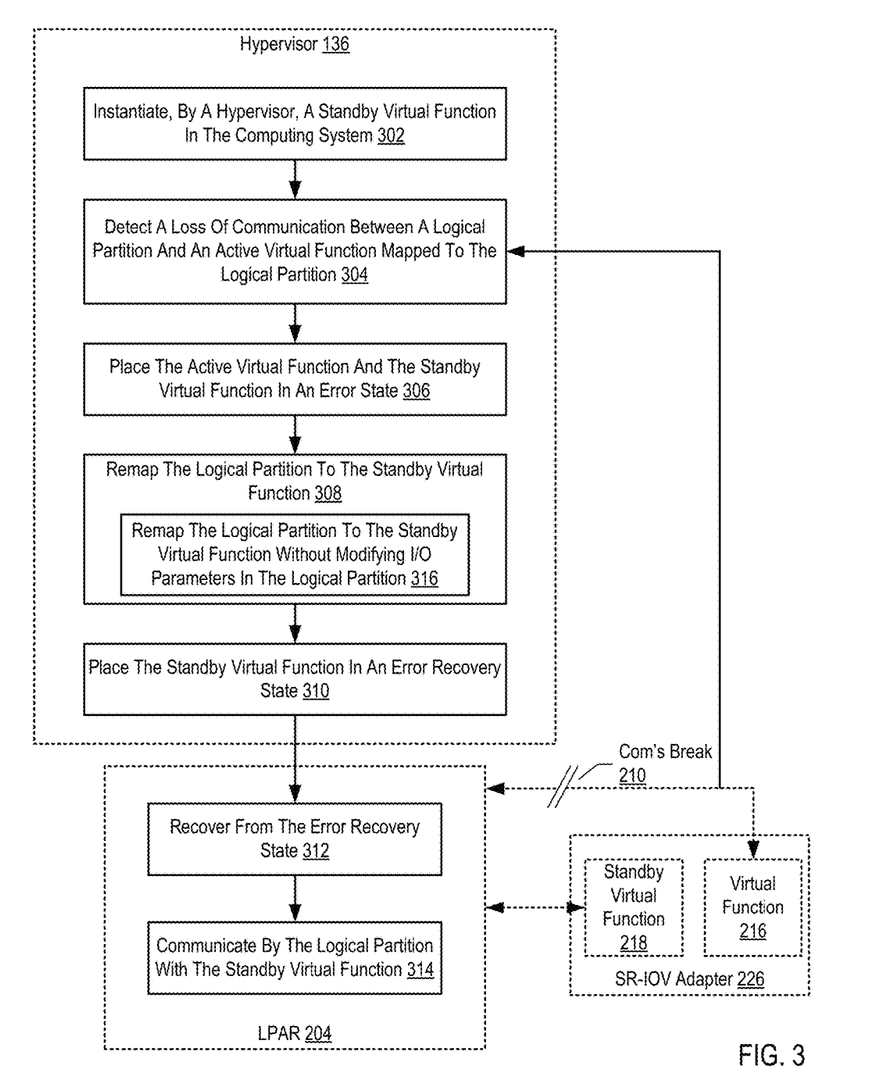
FIG. 3 sets forth a flow chart illustrating an exemplary method for failover of a virtual function exposed by an SR-IOV adapter according to embodiments of the present invention.

For further explanation, FIG. 3 sets forth a flow chart illustrating an exemplary method for failover of a virtual function exposed by an SR-IOV adapter according to embodiments of the present invention. The method of FIG. 3 includes instantiating (302), by a hypervisor (136), a standby virtual function (218) in the computing system. Instantiating a standby virtual function (218) may be carried out by creating the standby virtual function and provisioning the standby virtual function with configuration parameters.

The standby virtual function may be created to support any or most active virtual functions supported by the hypervisor. Alternatively, the standby virtual function may be created to support a specific active virtual function or a group of active virtual functions. Such a standby virtual function may be created on the same network adapter as the active virtual function or the standby virtual function may be created on a network adapter separate from the network adapter hosting the active virtual function.

Once created, the hypervisor may provision the standby virtual function with configuration parameters. The configuration parameters may be the same or similar to the configuration parameters of a specific active virtual function. Alternatively, the configuration parameters may be generic configuration parameters able to support any, most, or a subset of the active virtual functions hosted by the hypervisor. The configuration parameters include information necessary for the standby virtual function to operate as an active virtual function for a logical partition, and may include MAC addresses, bandwidth limits, throughput limits, DMA addresses, permissions, virtual LAN information, and the like. The hypervisor may provision the standby virtual function with the configuration parameters using an adjunct partition and a physical function of the network adapter hosting the standby virtual function.

The hypervisor may retrieve configuration parameters from the active virtual function or from a location in memory configured to store the configuration parameters for the active virtual function. Further, if a failure of the active virtual function is predicted by the hypervisor, the configuration parameters for the standby virtual function may be altered from the configuration parameters for the active virtual function in order to avoid the same type of failure.

The method of FIG. 3 also includes detecting (304) a loss (210) of communication between a logical partition (204) and an active virtual function (216) mapped to the logical partition (204). Detecting (304) a loss (210) of communication between a logical partition (204) and an active virtual function (216) may be carried out by detecting a failure of the active virtual function. Detecting (304) a loss (210) of communication between a logical partition (204) and an active virtual function (216) may also be carried out by receiving, by the hypervisor (136), a notification from the adjunct partition (202) that the active virtual function (216) is not operating properly. The physical function (214) may monitor the virtual functions hosted by the network adapter (226), such as the active virtual function (216). The physical function (214) may detect a loss of communication or other condition of the active virtual function (216) that indicates a current or immediate loss of communication and notify the adjunct partition (202) of the condition.

The loss of communication may be detected by the hypervisor before the logical partition mapped to the active virtual function is aware of the loss of communication. The active virtual function may present symptoms of failure, or a likelihood of failure, that are detectable by the hypervisor. Such symptoms may not be immediately detectable by the logical partition.

The method of FIG. 3 also includes placing (306) the active virtual function (216) and the standby virtual function (218) in an error state. Placing (306) the active virtual function (216) and the standby virtual function (218) in an error state may be carried out by the hypervisor (136) generating an interrupt to inform both the logical partition (204) and the standby virtual function (218) to enter into an error state, and to suspend operation with respect to the I/O communication between the logical partition and an virtual function. In this example, the logical partition may include a device driver that communicates with the active virtual function, and the device driver is the process within the logical partition that enters an error state where the remaining processes in the logical partition may continue executing. From the perspective of the logical partition, the error state may appear as a temporary disruption to normal communication with the network adapter.

The method of FIG. 3 also includes remapping (308) the logical partition (204) to the standby virtual function (218). In the method of FIG. 3, remapping (308) the logical partition (204) to the standby virtual function (218) may include remapping (316) the logical partition to the standby virtual function without modifying I/O parameters in the logical partition (204). Remapping (308) the logical partition (204) to the standby virtual function (218) may be carried out by updating configuration parameters that enable the logical partition (204) to communicate with and use the network adapter (226) by interfacing with the standby virtual function (218).

The method of FIG. 3 also includes placing (310) the logical partition and standby virtual function (218) in an error recovery state. Placing (310) the logical partition (204) and the standby virtual function (218) in an error recovery state may be carried out by the hypervisor (136), and may include the hypervisor (136) generating an error recovery interrupt to indicate initiation of an error recovery.

The method of FIG. 3 also includes recovering (312) from the error recovery state and communicating (314) by the logical partition (204) with the standby virtual function (218). Recovering (312) from the error recovery state may include receiving the error recovery interrupt by the logical partition and/or the standby virtual function. The error recovery interrupt may cause the logical partition and the standby virtual function to begin communication. Once communication between the logical partition and the standby virtual function begins, the logical partition may not be aware of any remapping, and from the perspective of the logical partition, the standby virtual function appears identical to the previously active virtual function. In this way, no changes within the logical partition are needed to transition from using the active virtual function to using the standby virtual function.

Figure 4:
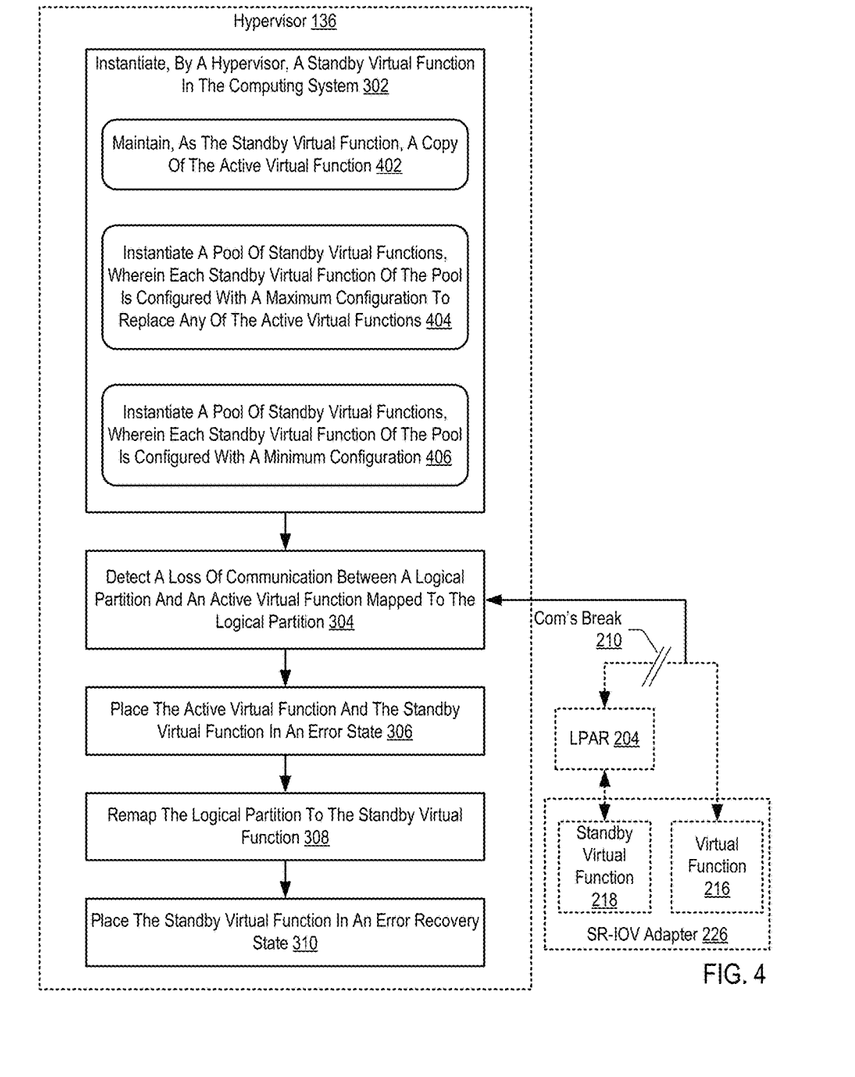
FIG. 4 sets forth a flow chart illustrating a further exemplary method for failover of a virtual function exposed by an SR-IOV adapter according to embodiments of the present invention.

For further explanation, FIG. 4 sets forth a flow chart illustrating a further exemplary method for failover of a virtual function exposed by an SR-IOV adapter according to embodiments of the present invention. The method of FIG. 4 is similar to the method of FIG. 3 in that the method of FIG. 4 includes: instantiating (302) a standby virtual function in the computing system; detecting (304) a loss of communication between a logical partition and an active virtual function mapped to the logical partition; placing (306) the active virtual function and the standby virtual function in an error state; remapping (308) the logical partition to the standby virtual function; and placing (310) the logical partition and standby virtual function in an error recovery state.

The method of FIG. 4 differs from the method of FIG. 3 in that in the method of FIG. 4 instantiating (302), by a hypervisor (136), a standby virtual function (218) in the computing system may be carried out in a variety of manners. For example, the in the method of FIG. 4, instantiating (302) a standby virtual function (218) may be carried out by maintaining (402), as the standby virtual function, a copy of the active virtual function. In instances in which the computing system includes a plurality of active virtual functions, the hypervisor may instantiate a copy of each active virtual function. Each virtual function may be a different capacity (different bandwidth capabilities, different throughput capabilities, different MIMO space size, different DMA space size, and the like). As such, in a system that includes a plurality of active virtual functions, maintaining a copy of each virtual function may include maintaining many different instantiations of virtual functions.

Maintaining (402), as the standby virtual function, a copy of the active virtual function may also include monitoring the configuration parameters for the active virtual function for changes or updates. Once an update or change to the active virtual function is made, that update or change is applied to the configuration parameters for the standby virtual function. In this way, the standby virtual machine operates as an up-to-date backup of the active virtual machine.

In some embodiments in which the computing system includes a plurality of active virtual functions, instantiating (302) a standby virtual function may include instantiating (404) a pool of standby virtual functions, where each standby virtual function of the pool is configured with a maximum configuration to replace any of the active virtual functions. A maximum configuration as the term is used in this specification refers to a virtual function configuration that is able to provide resources that satisfy most or all of the maximum requirements of any or most of the active virtual functions hosted by a network adapter. The maximum configuration may provide an amount of resources necessary to satisfy all or most of the requirements of any or most of the active virtual functions hosted by a network adapter. The hypervisor may instantiate a pool of standby virtual functions configured with a maximum configuration based on a determination that sufficient resources on the network adapter are available to support the pool of standby virtual functions configured with a maximum configuration. A pool of standby virtual functions may refer to one or a plurality of standby virtual functions.

As explained above, each virtual function may be a different capacity (different bandwidth capabilities, different throughput capabilities, different MIMO space size, different DMA space size, and the like). In embodiments in which each member of the pool of standby virtual functions is configured with a maximum configuration, any of the standby virtual functions may replace any of the active virtual functions on failover and no loss of performance in the virtual function communication channel need be experienced.

In some embodiments, instantiating (302) a standby virtual function may include instantiating (406) a pool of standby virtual functions, where each standby virtual function of the pool is configured with a minimum configuration. A minimum configuration as the term is used in this specification refers to a virtual function configuration that is able to provide resources that satisfy most or all of the minimum requirements of any or most of the active virtual functions hosted by a network adapter. The minimum configuration may provide the least amount of resources to satisfy the requirements of any or most of the active virtual functions hosted by a network adapter. The hypervisor may instantiate a pool of standby virtual functions configured with a minimum configuration based on a determination that there are insufficient resources on the network adapter to support a pool of standby virtual functions configured with a maximum configuration. The hypervisor may further determine that sufficient resources exist on the network adapter to support the pool of standby virtual functions configured with a minimum configuration. In embodiments in which each member of the pool of standby virtual functions is configured with a minimum configuration, any of the standby virtual functions may replace any, some, or most of the active virtual functions on failover but with an expected loss of performance in the virtual function communication channel.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of failover of a virtual function exposed by an SR-IOV ('Single Root I/O Virtualization') adapter of a computing system, the method comprising:
    instantiating, by a hypervisor, a standby virtual function in the computing system;
    detecting a loss of communication between a logical partition and an active virtual function mapped to the logical partition;
    placing the active virtual function and the standby virtual function in an error state;
    remapping the logical partition to the standby virtual function; and
    placing the logical partition and standby virtual function in an error recovery state.

2. The method of claim 1 further comprising:
    recovering from the error recovery state; and
    communicating by the logical partition, with the standby virtual function.

3. The method of claim 1 wherein remapping the logical partition to the standby virtual function further comprises remapping the logical partition to the standby virtual function without modifying I/O parameters in the logical partition.

4. The method of claim 1 wherein the active virtual function and the standby virtual function are exposed by the SR-IOV adapter.

5. The method of claim 1 wherein the active virtual function is exposed by a first SR-IOV adapter of the computing system and the standby virtual function is exposed by a second SR-IOV adapter of the computing system.

6. The method of claim 1 wherein instantiating a standby virtual function in the computing system further comprises:
    maintaining, as the standby virtual function, a copy of the active virtual function.

7. The method of claim 1 wherein the computing system comprises a plurality of active virtual functions and instantiating a standby virtual function in the computing system further comprises:
    instantiating a pool of standby virtual functions, wherein each standby virtual function of the pool is configured with a maximum configuration to replace any of the active virtual functions.

8. The method of claim 1 wherein the computing system comprises a plurality of active virtual functions and instantiating a standby virtual function in the computing system further comprises:
    instantiating a pool of standby virtual functions, wherein each standby virtual function of the pool is configured with a minimum configuration.

9. An apparatus for failover of a virtual function exposed by an SR-IOV ('Single Root I/O Virtualization') adapter of a computing system, the apparatus comprising a computer processor, a computer memory operatively coupled to the computer processor, the computer memory having disposed within it computer program instructions that, when executed by the computer processor, cause the apparatus to carry out:
    instantiating, by a hypervisor, a standby virtual function in the computing system;
    detecting a loss of communication between a logical partition and an active virtual function mapped to the logical partition;
    placing the active virtual function and the standby virtual function in an error state;
    remapping the logical partition to the standby virtual function; and
    placing the logical partition and the standby virtual function in an error recovery state.

10. The apparatus of claim 9 further comprising computer program instructions that, when executed by the computer processor, cause the apparatus to carry out:
    recovering from the error recovery state; and
    communicating, by the logical partition, with the standby virtual function.

11. The apparatus of claim 9 wherein the active virtual function and the standby virtual function are exposed by the SR-IOV adapter.

12. The apparatus of claim 9 wherein the active virtual function is exposed by a first SR-IOV adapter of the computing system and the standby virtual function is exposed by a second SR-IOV adapter of the computing system.

13. The apparatus of claim 9 wherein instantiating a standby virtual function in the computing system further comprises:
    maintaining, as the standby virtual function, a copy of the active virtual function.

14. The apparatus of claim 9 wherein the computing system comprises a plurality of active virtual functions and instantiating a standby virtual function in the computing system further comprises:
    instantiating a pool of standby virtual functions, wherein each standby virtual function of the pool is configured with a maximum configuration to replace any of the active virtual functions.

15. The apparatus of claim 9 wherein the computing system comprises a plurality of active virtual functions and instantiating a standby virtual function in the computing system further comprises:
    instantiating a pool of standby virtual functions, wherein each standby virtual function of the pool is configured with a minimum configuration.

16. A computer program product for failover of a virtual function exposed by an SR-IOV ('Single Root I/O Virtualization') adapter of a computing system, the computer program product disposed upon a non-transitory computer readable medium, the computer program product comprising computer program instructions that, when executed, cause a computer to carry out:
    instantiating, by a hypervisor, a standby virtual function in the computing system;
    detecting a loss of communication between a logical partition and an active virtual function mapped to the logical partition;
    placing the active virtual function and the standby virtual function in an error state;
    remapping the logical partition to the standby virtual function; and
    placing the logical partition and the standby virtual function in an error recovery state.

17. The computer program product of claim 16 further comprising computer program instructions that, when executed by the computer processor, cause the apparatus to carry out:
    recovering from the error recovery state; and
    communicating, by the logical partition, with the standby virtual function.

18. The computer program product of claim 16 wherein instantiating a standby virtual function in the computing system further comprises:
    maintaining, as the standby virtual function, a copy of the active virtual function.

19. The computer program product of claim 16 wherein the computing system comprises a plurality of active virtual functions and instantiating a standby virtual function in the computing system further comprises:
 instantiating a pool of standby virtual functions, wherein each standby virtual function of the pool is configured with a maximum configuration to replace any of the active virtual functions.

20. The computer program product of claim 16 wherein the computing system comprises a plurality of active virtual functions and instantiating a standby virtual function in the computing system further comprises:
 instantiating a pool of standby virtual functions, wherein each standby virtual function of the pool is configured with a minimum configuration.

\* \* \* \* \*